Oct. 23, 1934.  C. C. MANCHESTER  1,977,685
FLOAT
Filed Jan. 8, 1932   2 Sheets-Sheet 1
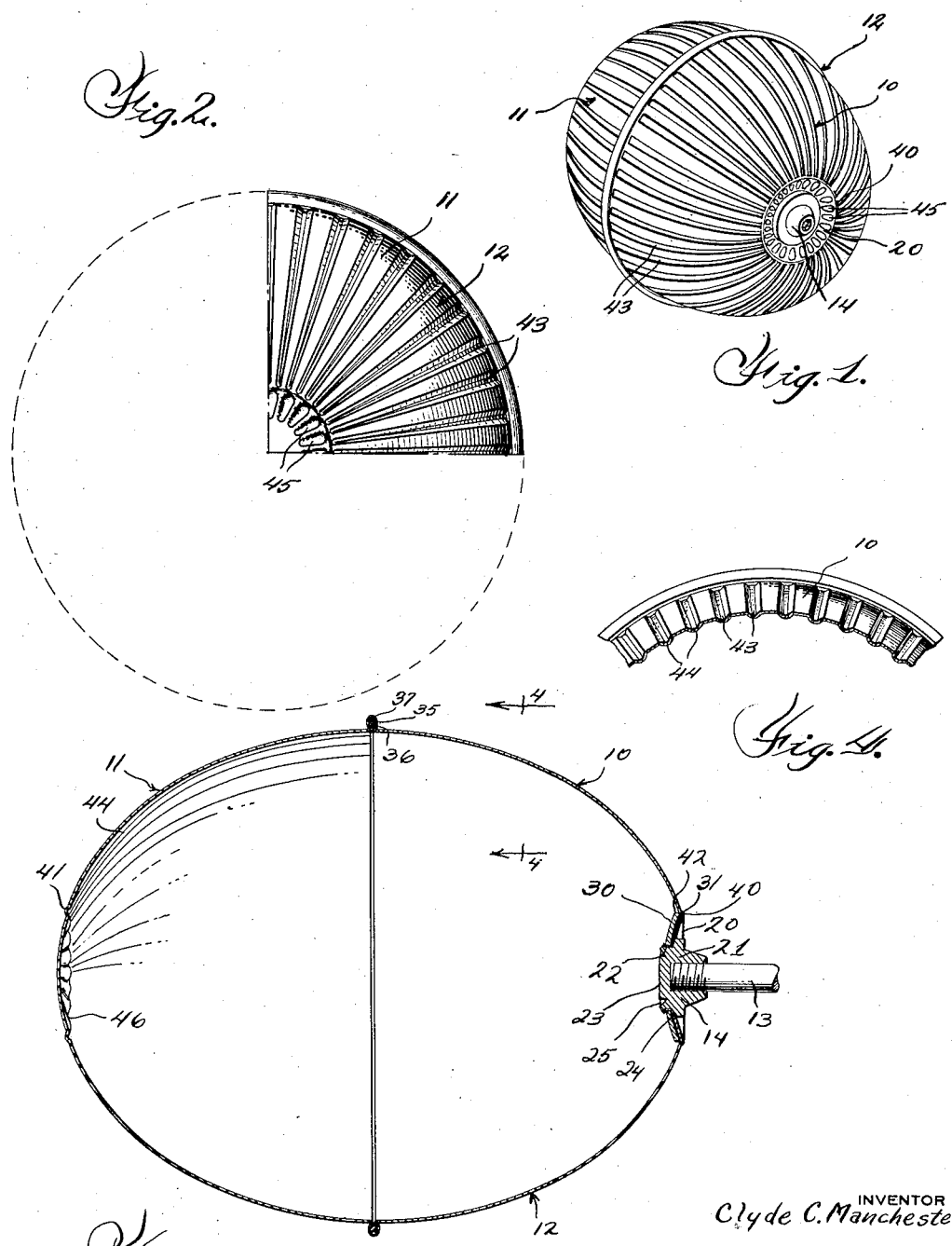

Oct. 23, 1934.  C. C. MANCHESTER  1,977,685
FLOAT
Filed Jan. 8, 1932　　2 Sheets-Sheet 2
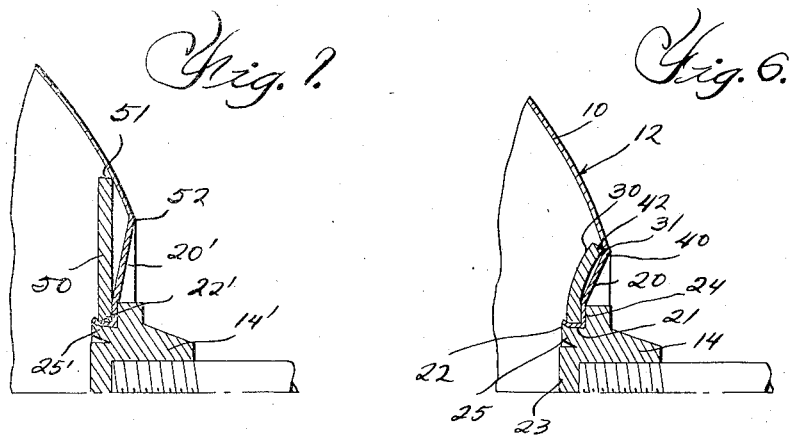
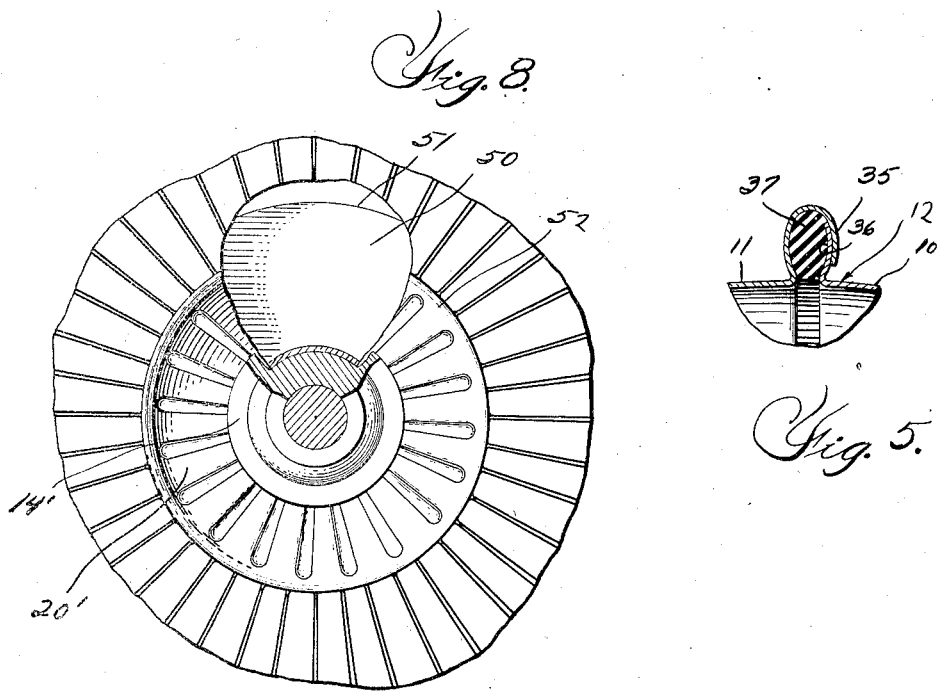
INVENTOR
Clyde C. Manchester
BY
ATTORNEYS Patented Oct. 23, 1934

1,977,685

UNITED STATES PATENT OFFICE 1,977,685

FLOAT

Clyde C. Manchester, Toledo, Ohio, assignor to The Ayling & Reichert Company, Toledo, Ohio, a corporation of Ohio Application January 8, 1932, Serial No. 585,575

14 Claims. (Cl. 137—104)

This invention relates to an improved means for connecting a plug or the like to a metal wall and relates more particularly to means for connecting a spud or like member to the wall of a float of the character commonly employed in a flush tank, and to means for reinforcing this connection.

This invention relates also to a float formed of separate sections and contemplates the provision of an improved gasket adapted to be positioned between these sections to render the connection between the same water-tight.

Still further this invention relates to means for reinforcing the body portion of a float or like element to eliminate danger of the element being bent or broken in use.

The numerous objects and advantages of this invention will become more apparent as the following description proceeds, particularly when reference is had to the accompanying drawings, wherein several embodiments of the inventive idea are disclosed in detail, and wherein:

Fig. 1 is a semi-diagrammatic perspective view of a float constructed in accordance with the teachings of this invention;

Fig. 2 is an end view of the float shown in Fig. 1, the view showing the opposite end of the float from that shown in Fig. 1;

Fig. 3 is a longitudinal sectional view through the float;

Fig. 4 is a transverse sectional view through the float taken substantially on the line 4—4 of Fig. 3;

Fig. 5 is an enlarged fragmentary sectional view showing the connection between the meeting edges of the sections of the float;

Fig. 6 is an enlarged fragmentary sectional view showing the connection between the spud and the wall of the float;

Fig. 7 is a view similar to Fig. 6 showing a slightly modified form of construction; and Fig. 8 is an end elevational view with parts broken away of the structure shown in Fig. 7.

Referring then particularly to the drawings wherein like reference characters designate corresponding parts throughout all views, the reference characters 10 and 11 designate the two sections of a metal float or like element designated generally by the reference character 12. These sections are preferably stamped or otherwise formed of sheet metal and are joined at their meeting edges in a manner which will hereinafter be more fully described. The reference character 13 designates a float arm or rod having its end threaded in a spud or plug 14, which plug is rigidly secured to the float. The present invention relates first to an improved means for connecting this plug to the float wall and for reinforcing this connection.

Broadly, this connection includes a washer which is rigidly secured to the plug and a depression which is formed in one of the sections of the float, either the plug or the washer being firmly connected to the metal of the float wall adjacent the center of this depression. The washer is provided with a bearing portion for engagement with the metal wall of the float on a circumferential line spaced from the connection between the wall of the float and the washer or plug with the result that the portion of the float wall within the area defined by the bearing portion of the washer tends to prevent tilting of the plug relative to the float wall or tearing of the float wall adjacent its point of connection to the plug or washer.

One embodiment of this structure is illustrated in Fig. 6 of the drawings, and by reference to this figure it will be noted that one of the sections of the float such, for example, as the section 10 is provided adjacent its one end with a depression 20. This depression may be formed during stamping of the section, and there is also preferably formed centrally of this depression an opening 21 defined by an inwardly extending continuous annular flange 22. The spud or plug 14 is provided with an inner portion 23 of a size sufficient to fit snugly within the opening 22, and to facilitate clamping of the spud to the metal wall, the spud may be provided intermediate its ends with an annular shoulder 24 adapted to engage the float shell adjacent the opening therein when the spud is inserted in the opening.

The reference character 30 designates a dished washer, and this washer is placed over the flange 22 with the concave face of the washer directed toward the inner surface of the depression. A riveting tool (not shown) having a suitable cutting edge is then forcibly pressed against the portion 23 of the spud to turn back a peripheral flange 25 thereon. During the bending of this flange a return bend is formed in the flange 22, and the flange 25 clamps the return bend in the flange 22 against the adjacent portion of the washer 30 and clamps the two of these elements against the shoulder 24.

It will be noted that the washer 30 is provided with a bearing portion 31 which is spaced from the line of connection of the washer to the spud and which is arranged for engagement with the wall of the float shell. In this embodiment of the invention the metal of the float wall within the area defined by the bearing portion of the washer is preferably drawn straight in the manner illustrated, with the result that rocking of the spud relative to the metal wall is resisted by the tensile strength of the metal wall between the portion thereof fixed relative to the washer and the portion thereof engaged by the bearing portion of the washer. Since the washer is rigidly fixed to the plug, it will be apparent that any rocking movement of the plug will be imparted to the washer, and the pressure exerted by the bearing portion of the washer on the metal wall will be distributed over a large area of the wall.

For the purpose of securing the sections 10 and 11 of the float to each other, these sections are joined at their meeting edges by peripheral interlocking flanges 35 and 36, the flange 35 being bent over the flange 36 in the manner clearly illustrated in Fig. 5 of the drawings. According to the teachings of this invention a gasket 37 formed of a compressible fibrous material such, for example, as rubberoid, is positioned between the flanges 35 and 36 so that this gasket is compressed when the sections of the float are secured together. A gasket formed of this material, when clamped between the flanges 35 and 36 will provide a fluid-tight joint between the sections of the float as will be clearly apparent.

For reinforcing the float shell the latter is preferably provided adjacent its opposite ends with the annular ribs 40 and 41. If desired, the bearing portion 31 of the washer 30 may be arranged to engage in the annular channel 42 formed on the inner surface of the section 10 opposite the rib 40, although this is not essential to effective operation of the connection.

Between the ribs 40 and 41 and the interlocking flanges 35 and 36, longitudinal channels 43 are formed in the sections 10 and 11 to provide inwardly directed ribs 44. Within the areas defined by the ribs 40 and 41 radially extending channels 45 are preferably formed to provide inwardly extending ribs 46 in the ends of the shell sections.

Thus it will be apparent that for the purpose of reinforcing the float to prevent bending or breaking thereof in use, there are provided longitudinally extending inwardly projecting ribs which are arranged between transversely or circumferentially arranged outwardly projecting ribs. By arranging the reinforcing ribs in this manner it will be found that the body of the float shell will be extremely strong and will be capable of withstanding any usage to which the same may be put.

In Figs. 7 and 8 a slightly modified form of construction is disclosed in which there is substituted for the dished washer 30 a flat washer 50. This washer is secured to the float wall adjacent the center of the depression 20′ therein and is also secured to the spud 14′ by the flange 25′ which is formed on the spud in the same manner as in the first described form of construction. In this modified form of construction, however, the bearing portion 51 of the washer engages the inner surface of the float shell on a circumferential line spaced a greater distance from the center of the depression than the rib 52 in the float wall which defines the outer periphery of the depression. In this form of construction, however, as in the first described form, the metal of the float wall within the area defined by the bearing portion of the washer will resist rocking of the spud with reference to the float wall.

From the above it will be apparent that the invention provides a connection between a plug or the like and a metal wall, this connection including a depression formed in the wall, a washer rigidly secured to the plug and a connection between the washer or plug or both and the metal wall adjacent the center of the depression. The washer is provided with a bearing portion arranged for engagement with the metal of the float wall on a circumferential line spaced from the center of the depression, with the result that the plug will be rigidly and firmly secured to the float wall and will be prevented from rocking or twisting with respect thereto.

It will be apparent further that the invention provides an improved gasket between the sections of the float shell and provides a novel arrangement of reinforcing ribs whereby the body portion of the shell is rendered sufficiently strong to eliminate all danger of breaking and bending in use.

While two embodiments of the invention have been described with some detail, it is to be understood that the description is for the purposes of illustration only and is not definitive of the limits of the inventive idea. The reinforcing and securing means described may be incorporated in a float structure, as illustrated in the drawings, or may be incorporated in any metallic structure wherein it is desired to secure a plug or the like to a metal wall and to reinforce this connection. The right is therefore reserved to make such changes in the details of construction and arrangement of parts as will fall within the purview of the attached claims.

What I claim as my invention is:

1. In combination, a metal wall having a depression formed therein, and spud and washer members firmly connected to the said wall and to each other adjacent the center of the said depression, said washer member having a bearing for engaging the said wall at points spaced outwardly from the connection between the washer and the spud and wall, that portion of the wall inwardly from said outwardly spaced points being non-parallel to the washer.

2. In combination, a thin metal wall, a plug firmly connected to said wall, and a washer having a portion rigid with the wall adjacent the said plug and having a bearing portion spaced from the first mentioned portion for engaging the said wall at points spaced from the plug, the material of said wall being drawn substantially straight between the portion thereof rigid with the first mentioned portion of the washer and the portion thereof engaged by the bearing portion of the washer.

3. The combination with a wall of thin material having a depression formed therein, and a plug mounted in said depression, of a washer having a portion attached to said wall adjacent the bottom of the depression therein and having a second portion spaced from said first mentioned portion for engaging said wall, the material of said wall between the portion thereof attached to said washer and the portion thereof engaged by the bearing portion of the washer being drawn substantially straight.

4. A float comprising a metal shell having a depression formed in its wall and having an opening in said depression, a plug mounted in said opening and firmly connected to said wall adjacent the said opening, and a washer having a concave surface facing the inner surface of said depression, said washer having a portion attached to the wall adjacent the opening therein and having a bearing portion for engaging the wall at points spaced from the opening therein.

5. A float comprising a metal shell having a depression formed in its outer surface and having an opening in said depression, a washer within said shell having a concave surface facing the inner surface of said depression, and an attachment plug mounted in said opening and having portions clampingly engaging the portion of said shell around said opening and the adjacent portion of said washer, said washer engaging the wall of said shell at points spaced from the point of clamping engagement.

6. A float comprising a metal shell having a depression concave in cross sectional shape formed in its one end and having an opening located substantially centrally of said depression, a washer having a concave surface facing the inner surface of said depression, and an attachment plug mounted in said opening and having portions clampingly engaging the portion of said shell around said opening and the adjacent portion of said washer.

7. A float comprising a metal shell having a depression substantially concave in cross sectional shape arranged in its one end and having an opening located substantially centrally of said depression and having a rib surrounding said depression and defining the periphery of the same, a washer having a concave surface, said washer being positioned within said shell with its concave surface facing the inner face of said depression and having its outer edge in engagement with a channel formed on the inner surface of said shell opposite said rib, and an attachment plug mounted in the opening in the shell and having portions clampingly engaging the portion of said shell around said opening and the adjacent portion of said washer.

8. In combination, a metal wall having a depression formed therein, a plug member, and a washer member rigidly secured to said plug member, one of said members being firmly connected to said wall adjacent the center of the said depression and said washer member having a bearing portion for engagement with the metal wall beyond the periphery of said plug member, the surface of the depression and the surface of the washer being non-parallel between said connection and the bearing portion of the washer.

9. In combination, a metal wall having a depression formed therein, and plug and washer members firmly connected to the said wall and to each other adjacent the center of the said depression, said washer member having a bearing portion engaging the metal wall on a circumferential line spaced outwardly beyond the periphery of the said plug member, the surface of the depression and the surface of the washer being non-parallel between said connection and the bearing portion of the washer.

10. A float comprising a metal shell having a depression at one end extending inwardly beyond the normal surface confines of the shell at such end, a plug member and a washer member rigidly secured to said plug member, one of said members being firmly connected to the wall of the depression adjacent the center of the said depression and said washer member having a bearing portion engaging the metal wall of the shell at points spaced outwardly from the center of the depression, the washer being non-parallel to the wall of the depression.

11. In combination, a metal wall having a depression formed therein, a plug member, and a washer member of greater width than said plug member rigidly secured to said plug member, one of said members being firmly connected to said wall adjacent the center of the said depression and said washer member having a bearing portion for engagement with the metal wall at points spaced from the connection between said wall and the one of said members, the metal wall at the points of engagement with the bearing portion of the washer being at an acute angle to the washer.

12. In combination, a metal wall having a depression formed therein, a plug member, and a washer member of greater diameter than said plug member rigidly secured to said plug member, one of said members being firmly connected to said wall adjacent the center of the said depression and said washer member having a bearing portion for engaging the metal wall on a circumferential line spaced outwardly from the center of said depression, the metal wall at the circumferential line of engagement with the bearing portion of the washer being at an acute angle to the washer.

13. In combination, a metal wall having a depression formed therein, a plug mounted in said depression, and a washer firmly secured to the plug, said washer having a portion firmly connected to the wall adjacent the center of the depression and having a second portion spaced from said first mentioned portion for bearing engagement on the wall, the portion of the depression between said spaced portions being at an acute angle to the surface of the washer.

14. In combination, a metal wall having a depression formed therein, a washer, and a plug fixed to the washer adjacent the center thereof, the central portion of said washer being rigid with the wall adjacent the center of the depression therein and said wall having a bearing on the washer at points spaced from the center of the washer, the metal wall at said spaced points being at an acute angle to the washer.

CLYDE C. MANCHESTER.